US011870178B2

(12) United States Patent
Durse et al.

(10) Patent No.: US 11,870,178 B2
(45) **Date of Patent: *Jan. 9, 2024**

(54) BACKING PLATE FOR MOUNTING AND SEALING AN ELECTRICAL CONNECTOR TO AN INTERMEDIATE SURFACE

(71) Applicant: Aptiv Technologies AG, Schaffhausen (CH)

(72) Inventors: Nicholas A. Durse, Youngstown, OH (US); Adam Wolfgang, Petersburg, OH (US)

(73) Assignee: Aptiv Technologies AG, Schaffhausen (CH)

( * ) Notice: Subject to any disclaimer, the term of this patent is extended or adjusted under 35 U.S.C. 154(b) by 7 days.

This patent is subject to a terminal disclaimer.

(21) Appl. No.: 17/504,899

(22) Filed: Oct. 19, 2021

(65) Prior Publication Data

US 2022/0037829 A1 Feb. 3, 2022

Related U.S. Application Data

(63) Continuation of application No. 16/824,031, filed on Mar. 19, 2020, now Pat. No. 11,171,440.

(60) Provisional application No. 62/820,914, filed on Mar. 20, 2019.

(51) Int. Cl.
*H01R 13/40* (2006.01)
*H01R 13/52* (2006.01)
*H01R 13/512* (2006.01)

(52) U.S. Cl.
CPC ....... *H01R 13/5202* (2013.01); *H01R 13/512* (2013.01)

(58) Field of Classification Search
CPC .......................... H01R 13/5202; H01R 13/512
USPC .......................................................... 439/587
See application file for complete search history.

(56) References Cited

U.S. PATENT DOCUMENTS

| | | | | |
|---|---|---|---|---|
| 3,643,207 A | 2/1972 | Cairns | | |
| 4,293,173 A | 10/1981 | Tricca | | |
| 4,859,189 A * | 8/1989 | Petersen | G01R 1/0475 | 439/71 |
| 5,020,996 A * | 6/1991 | Cheng | H01R 4/5066 | 439/78 |
| 7,455,552 B1 * | 11/2008 | Fang | H05K 5/064 | 439/736 |
| 7,618,286 B2 * | 11/2009 | Aoki | H01R 13/5205 | 439/587 |
| 8,568,168 B2 * | 10/2013 | Han | H01R 13/5208 | 439/587 |
| 9,515,500 B2 * | 12/2016 | Workman | H01R 13/5202 | |

(Continued)

*Primary Examiner* — Abdullah A Riyami
*Assistant Examiner* — Vladimir Imas
(74) *Attorney, Agent, or Firm* — Billion & Armitage

(57) ABSTRACT

A backing plate, a corresponding electrical connector for mating with the backing plate, an electrical header, and an assembly thereof are described herein. The backing plate has an inner portion having a first thickness and an outer portion having a second thickness that is greater than the first thickness. The outer portion surrounds a perimeter of the inner portion and forms a cavity within the backing plate for acceptance of the electrical header. The backing plate also contains a connector attachment portion configured to attach the backing plate to the electrical connector and an intermediate surface attachment portion configured to attach the backing plate to the intermediate surface.

18 Claims, 6 Drawing Sheets

(56) References Cited

U.S. PATENT DOCUMENTS

| | | | | |
|---|---|---|---|---|
| 9,622,355 | B2 * | 4/2017 | Stern | H05K 3/30 |
| 9,979,215 | B2 | 5/2018 | Workman et al. | |
| 10,283,905 | B2 * | 5/2019 | Regnier | H01R 13/625 |
| 10,290,972 | B2 | 5/2019 | Gunreben et al. | |
| 10,404,008 | B2 * | 9/2019 | Miller | H01R 25/003 |
| 10,637,188 | B2 * | 4/2020 | Schmidt | H01R 43/26 |
| 2009/0197478 | A1 * | 8/2009 | Mandel | H01R 13/504<br>439/736 |
| 2012/0238134 | A1 * | 9/2012 | Matsuoka | H01R 13/405<br>439/587 |
| 2013/0052853 | A1 * | 2/2013 | Natter | B60L 53/31<br>439/345 |
| 2019/0103686 | A1 * | 4/2019 | Wilson | H01R 12/515 |

* cited by examiner

BACKING PLATE FOR MOUNTING AND SEALING AN ELECTRICAL CONNECTOR TO AN INTERMEDIATE SURFACE

CROSS-REFERENCE TO RELATED APPLICATION

This application is a continuation of U.S. application Ser. No. 16/824,031 filed Mar. 19, 2020, which claims the benefit under 35 U.S.C. § 119(e) of U.S. Provisional Patent Application No. 62/820,914 filed on Mar. 20, 2019, the entire disclosure of which is hereby incorporated by reference.

BACKGROUND

Many electrical connectors are designed to form a seal with intermediate surfaces that the connectors mount to, e.g., some flush-mount connectors attach to, and create a seal with, flat surfaces made from sheet metal or another semi-rigid structure. Often times, these intermediate surfaces have irregularities (high flatness tolerances, bows, bends, creases, etc.) that can weaken the seal made with the connector. Permanent, intermediate interfaces or fixtures may be used strengthen the seal, although these devices need to be mounted and sealed to the intermediate surfaces before installing the connectors. Additional manufacturing is required (e.g., welding, gluing, cleaning, polishing, coating, sanding) to affix permanent-intermediate interfaces or features to the intermediate surfaces. The additional manufacturing steps add complexity, delay, and cost to making electrical connections with the connectors. Furthermore, due to their attachment to the intermediate surface, permanent fixtures can disrupt a shielding circuit integrated within and designed to protect the connector.

SUMMARY

In some aspects, a backing plate is described that is configured to mount and seal an electrical connector to an intermediate surface disposed between the backing plate and the electrical connector. The backing plate has an inner portion having a first thickness and an outer portion having a second thickness that is greater than the first thickness. The outer portion surrounds a perimeter of the inner portion and forms a cavity within the backing plate. The backing plate also contains a connector attachment portion configured to attach the backing plate to the electrical connector and an intermediate surface attachment portion configured to attach the backing plate to the intermediate surface.

In other aspects, an electrical connector assembly is described that contains an electrical connector, the backing plate, and an electrical header. The electrical connector has a backing plate attachment portion configured to mate with the connector attachment portion of the backing plate and a sealing surface configured to seal the electrical connector to an intermediate surface. The electrical header contains a lead portion configured to extend through cutouts of the backing plate and a terminal portion configured to mate with corresponding terminals of the electrical connector.

This summary is provided to introduce simplified concepts for a backing plate for mounting and sealing an electrical connector to an intermediate surface, which is further described below in the Detailed Description and Drawings. For ease of description, the disclosure focuses on automotive systems; however, the techniques are not limited to automobiles but apply to electrical connectors of other types of vehicles and systems. This summary is not intended to identify essential features of the claimed subject matter, nor is it intended for use in determining the scope of the claimed subject matter.

BRIEF DESCRIPTION OF THE DRAWINGS

A backing plate for mounting and sealing an electrical connector to an intermediate surface and an assembly thereof are described with reference to the following drawings. The same numbers are used throughout the drawings to reference like features and components.

DETAILED DESCRIPTION

Overview

Many electrical connectors are designed to seal to intermediate surfaces. Often, the intermediate surfaces have irregularities that weaken the seal. To mitigate the sealing problems, traditional connectors have relied on permanent-intermediate fixtures that are affixed to the intermediate surfaces. While using permanent-intermediate fixtures may strengthen the seal, they require additional manufacturing steps, which add cost, weight, and size to making electrical connections with the connectors. Furthermore, permanent-intermediate fixtures are often electrically coupled to the surfaces, which does not allow for permanent-intermediate fixtures to be included in a shielding circuit of the connectors.

In order to overcome these problems, assemblies are described herein that comprise a backing plate for mounting and sealing an electrical connector to an intermediate surface. The backing plate is configured to facilitate mounting and sealing of the electrical connector, without disrupting shielding of the electrical connector and without necessitating additional sealing or affixing of the backing plate to the intermediate surface.

Backing Plate Assembly

Figure 1:
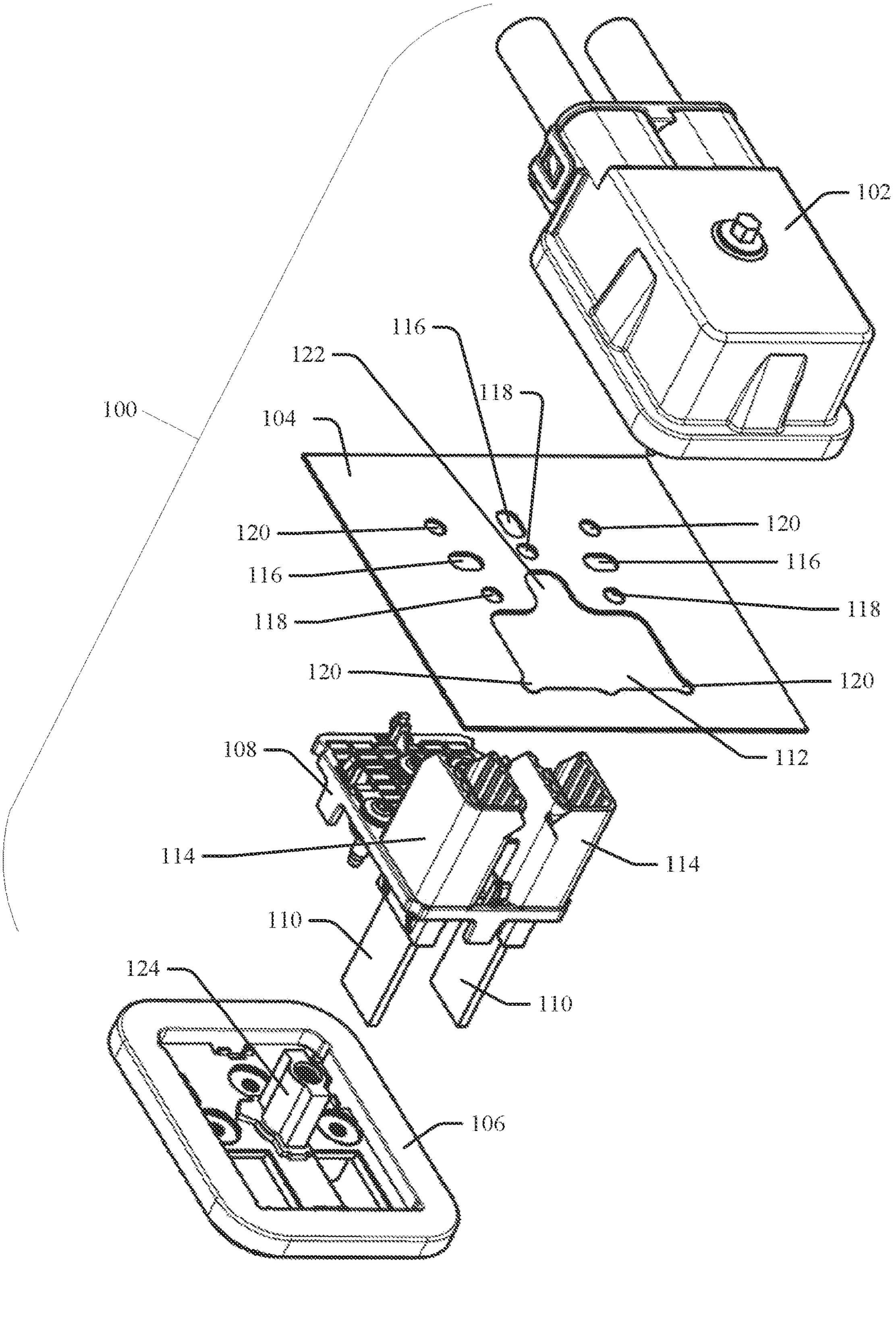
FIG. 1 illustrates an example assembly of a backing plate for mounting and sealing an electrical connector to an intermediate surface.

FIG. 1 illustrates an example assembly 100 of a backing plate for mounting and sealing an electrical connector to an intermediate surface. The assembly 100 contains an electrical connector 102 configured to attach and seal to an intermediate surface 104 via a backing plate 106. The intermediate surface 104 is of a mounting structure (not shown), e.g., box, container, wall, plate, or stamped structure, and may be made of metal such as stainless steel, sheet metal (steel or any of the materials listed here), aluminum, copper, or tin. As discussed above, the intermediate surface 104 may also contain an electrically resistive coating applied to an entirety of the intermediate surface 104.

The assembly 100 also contains an electrical header 108, that is generally optional and configured to be disposed between the backing plate 106 and the electrical connector 102. The electrical header 108 is configured to act as an electrical bridge between one or more electrical leads 110 originating from an opposite side of the backing plate 106, e.g., within a structure defined by the intermediate surface 104, to the electrical connector 102. Although shown as being disposed between the backing plate 106 and the intermediate surface 104, the electrical header 108 may be disposed between the intermediate surface 104 and the electrical connector 102, or not used at all, without departing from the scope of the disclosure.

The intermediate surface 104 contains at least one terminal hole 112 configured to allow the terminal portion 114 of the electrical header 108 to pass therethrough. The intermediate surface 104 also contains one or more header locating holes 116 configured to locate the electrical header 108, one or more backing plate mounting holes 118 configured to facilitate mounting of the electrical header 108 and the backing plate 106 to the intermediate surface 104, one or more connector locating holes 120 configured to facilitate locating the electrical connector 102, and at least one connector attachment portion hole 122 configured to allow a connector attachment portion 124 of the backing plate 106 to pass therethrough. The arrangement, number, and locations of the holes described above may differ without departing from the scope of the invention. Furthermore, the holes may be any shape and may include multiple holes, e.g., terminal hole 112, connector locating holes 120, and connector attachment portion hole 122, which are all part of the same cutout in the intermediate surface 104.

By using a "free-floating" backing plate, an effective seal may be made between the electrical connector 102 and the intermediate surface 104 without the use of permanent fixtures. Furthermore, because only simple manufacturing operations (cutouts, holes, etc.) need to be performed on the intermediate surface 104, costs of the assembly may be reduced. Electrically resistive coatings (e-coatings) may be applied to an entire intermediate surface, which allows for the backing plate 106 to be used without disrupting a shielding circuit for the electrical connector, e.g., the e-coating applied to the intermediate surface electrically isolates the electrical connector 102 and the backing plate 106 from the intermediate surface 104.

Electrical Connector

Figure 2:
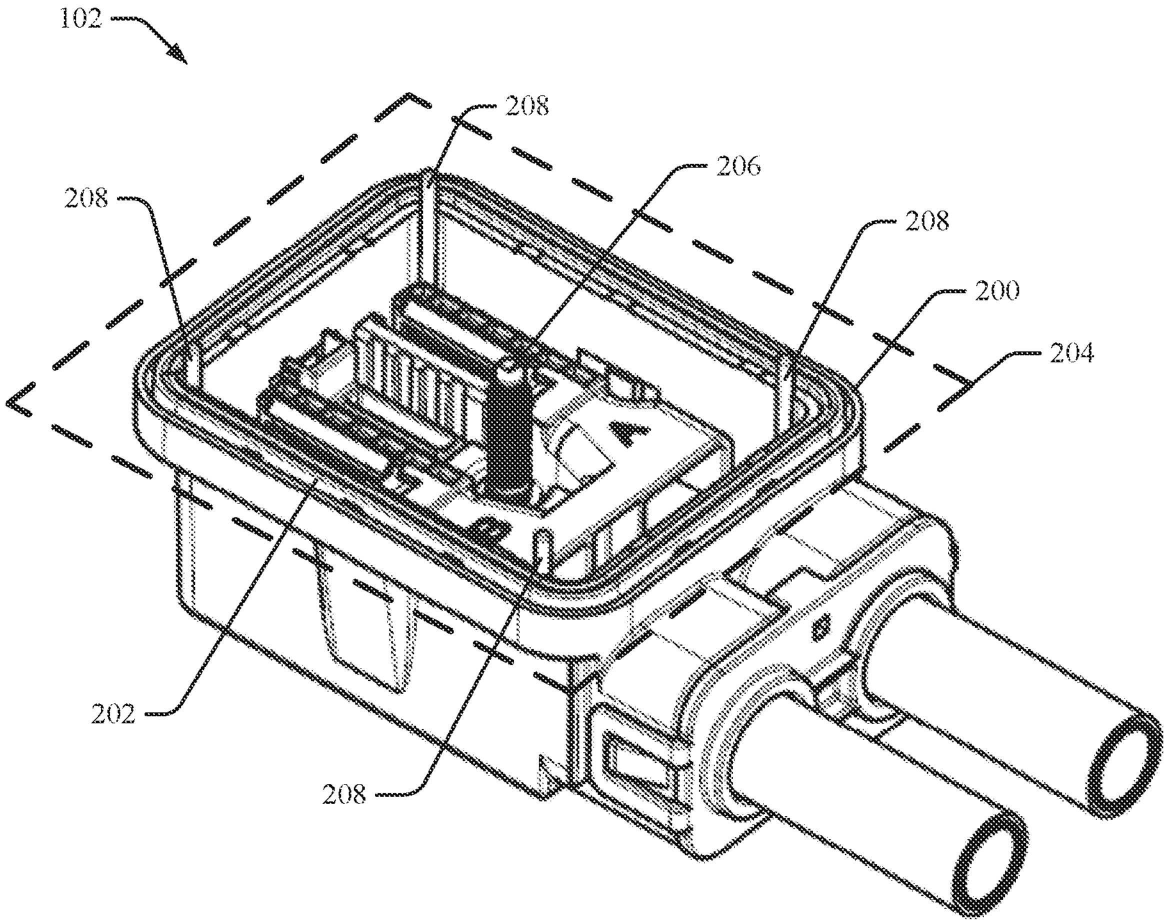
FIG. 2 illustrates an example electrical connector.

FIG. 2 is an illustration of the electrical connector 102 shown in greater detail than in FIG. 1. The electrical connector has a sealing surface 200 that is configured to seal the electrical connector 102 to the intermediate surface 104 when mounted. In the example electrical connector 102, the sealing surface 200 comprises two perimeter walls of equal height surrounding a groove for housing a sealing ring 202. The sealing surface 200 defines a sealing plane 204 that is configured to abut to, or nearly abut to, the intermediate surface 104 when mounted. Although shown as a profiled ring, the sealing ring 202 may be an O-ring within a corresponding O-ring groove in the sealing surface 200. The sealing surface 200 may have no grooves and instead, may be configured to accept a flat gasket between the electrical connector 102 and the sealing surface. In other situations, a combination of grooves, O-rings, and flat gaskets are used to generate a seal between the electrical connector 102 and the sealing surface 200. It should also be readily apparent that, although the electrical connector 102 is described in terms of the sealing surface 200 being flat, the electrical connector 102 may be configured to mount and seal to other surface types, e.g. angled surfaces, as long as the backing plate 106, the intermediate surface 104, and the sealing surface 200 of the electrical connector 102 have corresponding shapes.

The electrical connector 102 contains a backing plate attachment portion 206 for engaging with the connector attachment portion 124 of the backing plate 106. Although the electrical connector 102 is shown as a bolted connector, other types of connectors such as snap connectors, latch connectors, or lever-type connectors may be implemented without departing form the scope of this disclosure.

The electrical connector 102 also contains one or more connector locator portions 208 that correspond to the connector locating holes 120 in the intermediate surface 104. The connector locator portions 208 are configured to extend through the intermediate surface 104 and the electrical header 108 and into the backing plate 106, as will be discussed further in relation to FIG. 3.

Backing Plate

Figure 3:
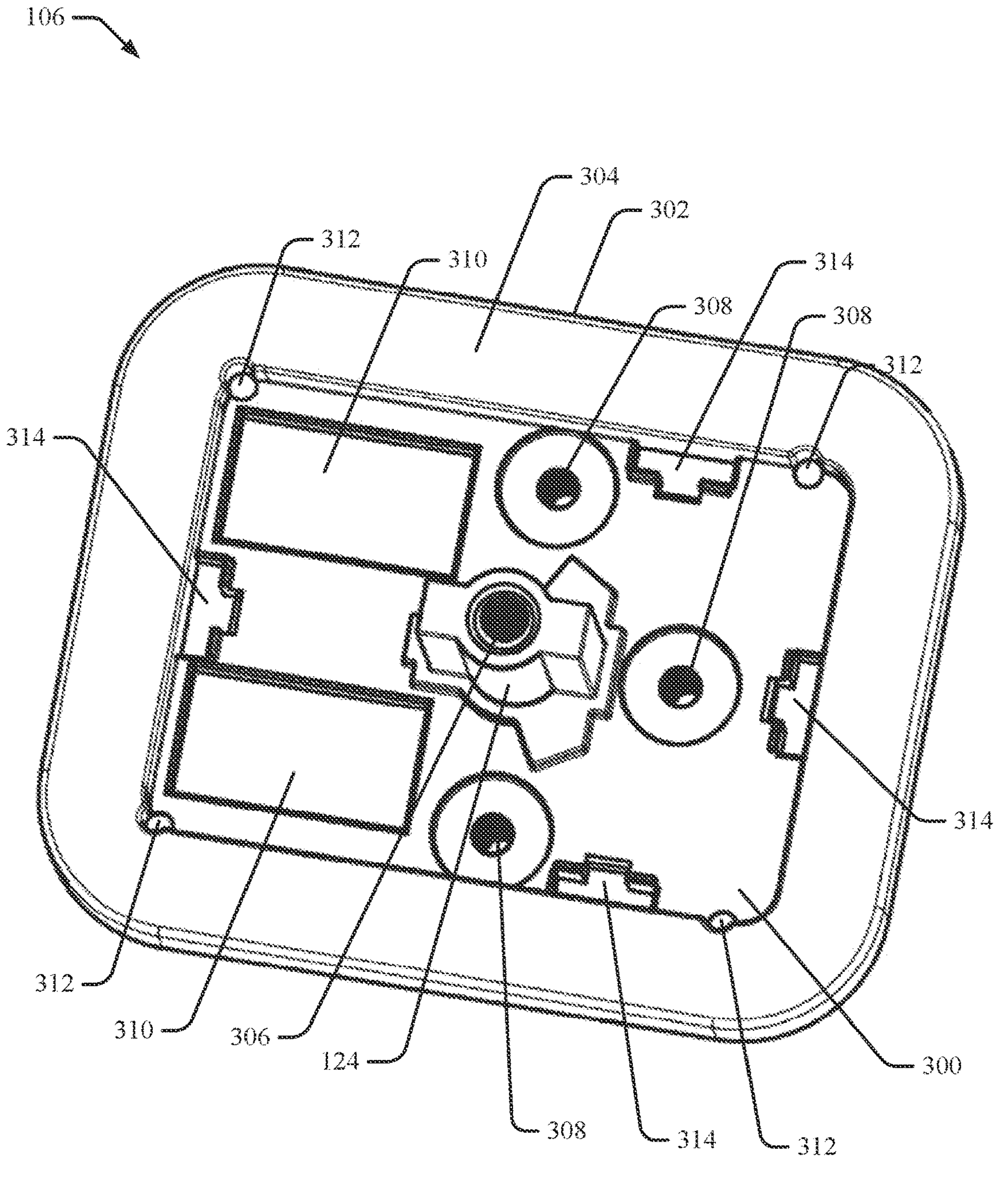
FIG. 3 illustrates an example backing plate.

FIG. 3 is an illustration of the backing plate 106 shown in greater detail than in FIG. 1. The backing plate 106 has an inner portion 300 having a first thickness. Surrounding the inner portion 300 is an outer portion 302 having a second thickness that is greater than the first thickness. The outer portion 302 forms a cavity within the backing plate 106 for acceptance of the electrical header 108.

Although described and shown with inner and outer portions 300, 302 having differing thicknesses, in some implementations, the backing plate 106 may have a relatively uniform thickness. For example, if the electrical header 108 is not used, or if the electrical header 108 is disposed between the electrical connector 102 and the intermediate surface 104, then the inner portion 300 and the outer portion 302 may have similar thicknesses.

The backing plate 106 has the connector attachment portion 124 that enables the electrical connector 102 to seal to the intermediate surface 104 by compressing the intermediate surface 104 between the sealing surface 200 of the electrical connector 102 and a backing surface 304 of the backing plate 106. The backing surface 304 is generally flat and configured to deform any surface irregularities in the intermediate surface 104 to comply with the backing surface 304 when the electrical connector 102 is attached to the backing plate 106. The backing surface 304 may additionally comprise a sealing surface or sealing grooves to facilitate a sealing, isolate vibration, or electrically insulate the backing plate from the intermediate surface (e.g., with a gasket or O-ring). For example, if the intermediate surface 104 is part of an open structure, then sealing on both sides of the intermediate surface 104 may be necessary, however, if the intermediate surface 104 is part of a closed structure (e.g., a box) then sealing from the inside of the intermediate surface 104 may not be necessary.

The connector attachment portion 124 is shown as a boss extending from the inner portion 300 in a direction towards the electrical connector 102. The boss has a length that is generally configured to extend through the electrical header 108, through the intermediate surface 104, and into the electrical connector 102 for engagement with the backing plate attachment portion 206. To engage the backing plate attachment portion 206, the connector attachment portion 124 contains a threaded hole 306. As described above, if the electrical connector 102 is not a bolted-type connector, the connector attachment portion 124 may be another shape, such as a wall with cam follower projections in the case of a lever-type electrical connector.

The backing plate 106 also contains an intermediate surface attachment portion 308 that allows for a staging of the backing plate 106 and electrical header 108 relative to the intermediate surface 104 prior to installing the electrical connector 102. In some embodiments, the intermediate surface attachment portion 308 is one or more threaded holes disposed in bosses extending away from the inner portion 300. In this example, screws are configured to be disposed through the backing plate mounting holes 118, through the electrical header 108, and into the intermediate surface attachment portion 308. In other embodiments, the intermediate surface attachment portion 308 may be one or more through-holes, e.g., to accept a rivet or sheet metal screw.

The backing plate 106 further contains one or more cutouts 310 configured to allow for the electrical leads 110 or a portion of the electrical header 108 to pass therethrough. The backing plate 106 also contains one or more connector locator holes 312 configured to accept connector locator portions 208 of the electrical connector 102 when the electrical connector 102 is installed. One or more header locator holes 314 are also disposed within the backing plate 106 and are configured to locate the electrical header 108 within the backing plate 106 prior to installation of the backing plate 106 and the electrical header 108 to the intermediate surface 104.

Assembly

Figure 4:
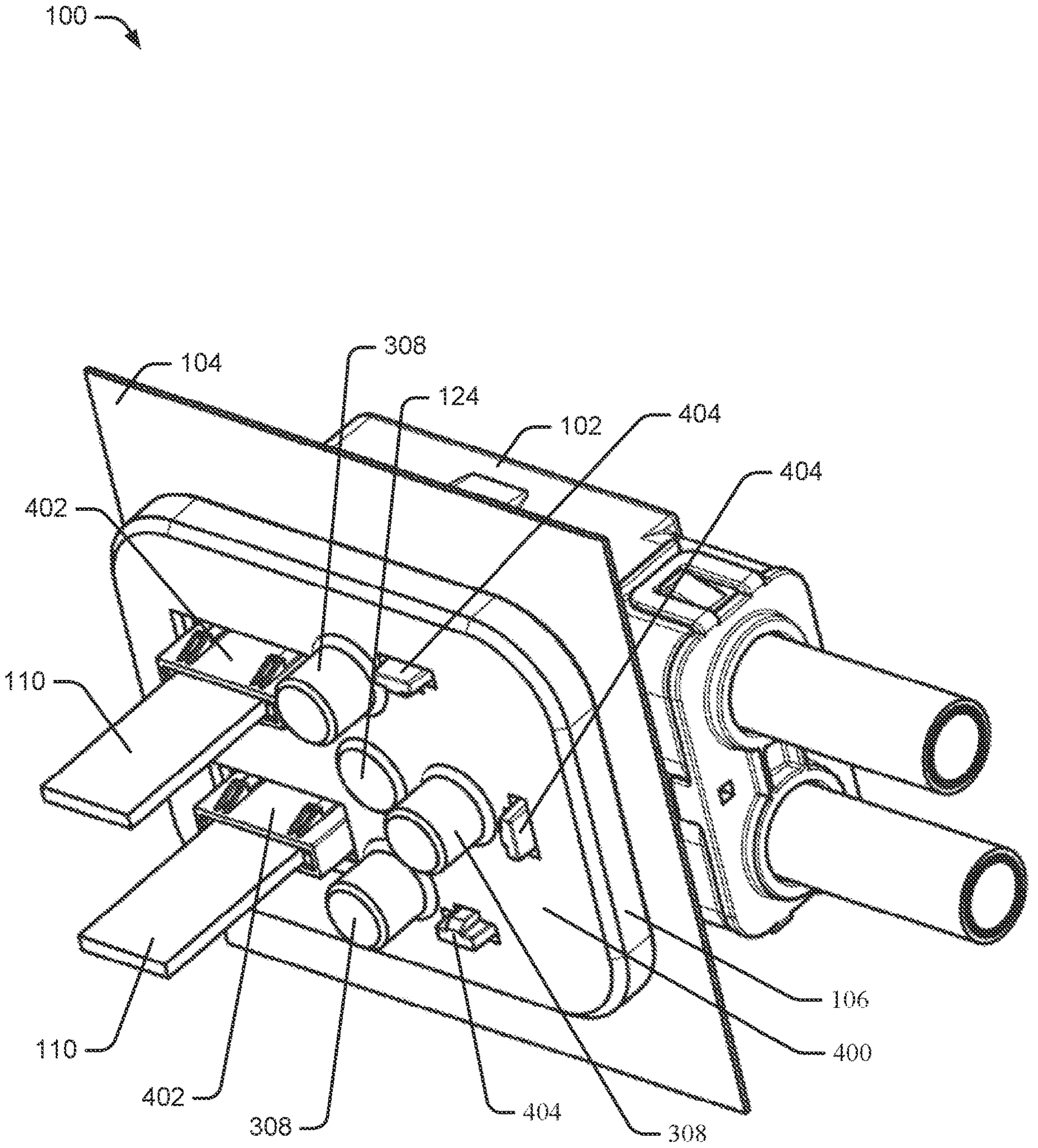
FIG. 4 illustrates the example assembly of FIG. 1 in an installed configuration.

FIG. 4 is an illustration of the example assembly 100 in an installed configuration. The electrical connector 102 is connected to the intermediate surface 104 via the backing plate 106, with the electrical header 108 disposed between the electrical connector 102 and the backing plate 106. The electrical leads 110 of the electrical header 108 extend through a back side 400 of the backing plate 106. More specifically, a lead portion 402 of the electrical header 108 that is configured to accept the electrical leads 110 extends through the back side of the backing plate 106. Alignment portions 404 of the electrical header 108 also extend through the back side 400 of the backing plate 106 though the header locator holes 314. Although the connector attachment portion 124 is shown as extending out the back side 400 of the backing plate 106 in addition to extending towards the electrical connector 102, the connector attachment portion 124 may not extend out the back side 400 of the backing plate 106, or may extend further away from the back side 400 backing plate 106, depending on a configuration of the electrical connector 102. As discussed above, the intermediate surface attachment portion 308 is shown extending out from the back side 400 of the backing plate 106.

Figure 5:
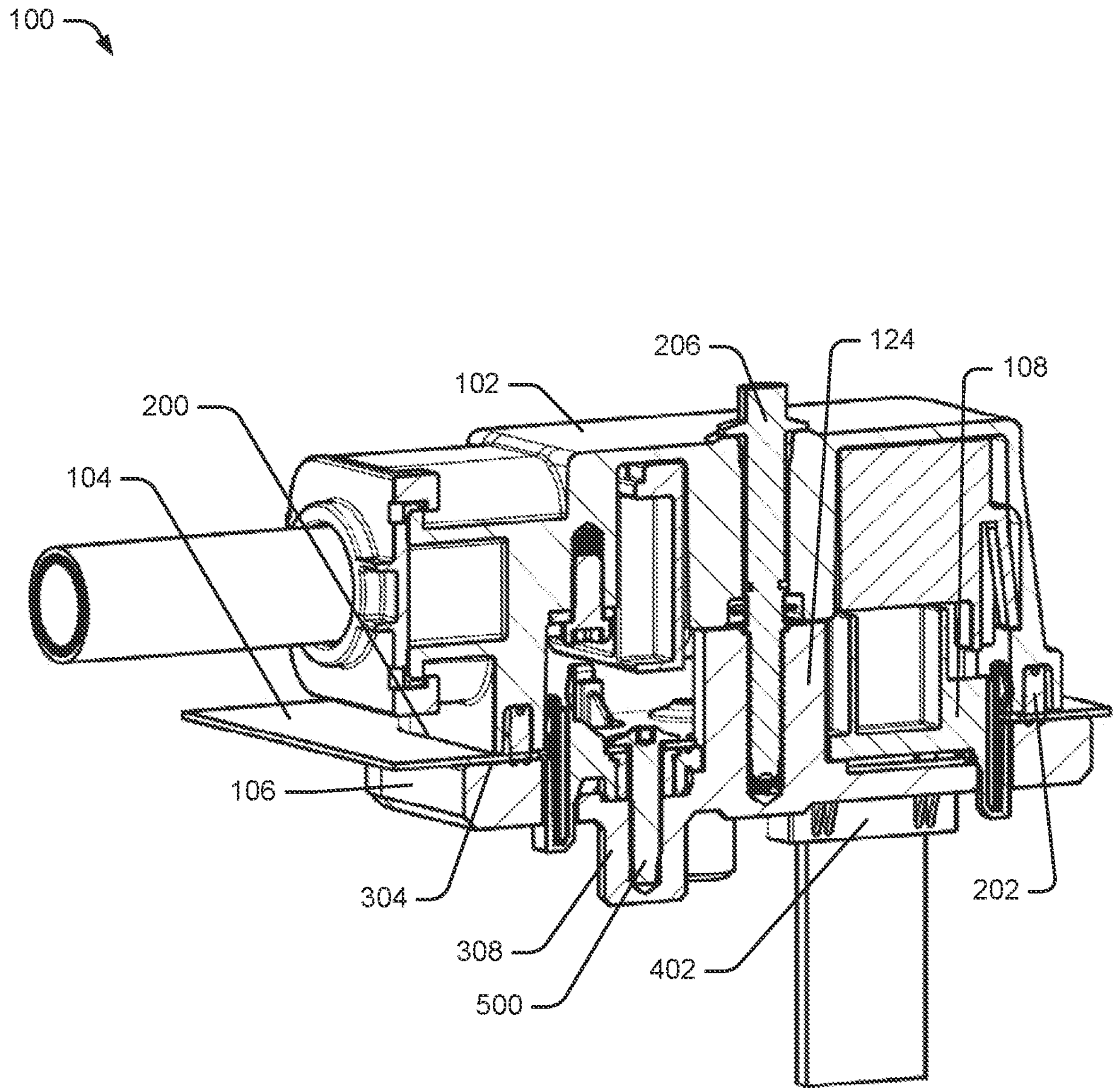
FIG. 5 illustrates a section view of the example assembly of FIG. 4.

FIG. 5 is a cutaway illustration of the example assembly 100 in an installed configuration. In the installed configuration, the electrical connector 102 is connected to the backing plate 106 via the backing plate attachment portion 206 threaded into the connector attachment portion 124. The sealing surface 200 abuts to or comes close to abutting to the intermediate surface 104 depending on a configuration of the sealing surface 200 and the sealing ring 202. Opposite the sealing surface 200, the backing surface 304 enables the sealing ring 202 to seal against the intermediate surface 104 when the backing plate attachment portion 206 is tightened even if the intermediate surface 104 has surface irregularities. The intermediate surface attachment portion 308 is illustrated as a boss with a threaded hole with a screw 500 threaded therein. The electrical header 108 is disposed between the backing plate 106 and the electrical connector 102 with the lead portion 402 of the electrical header 108 extending through the backing plate 106.

Figure 6:
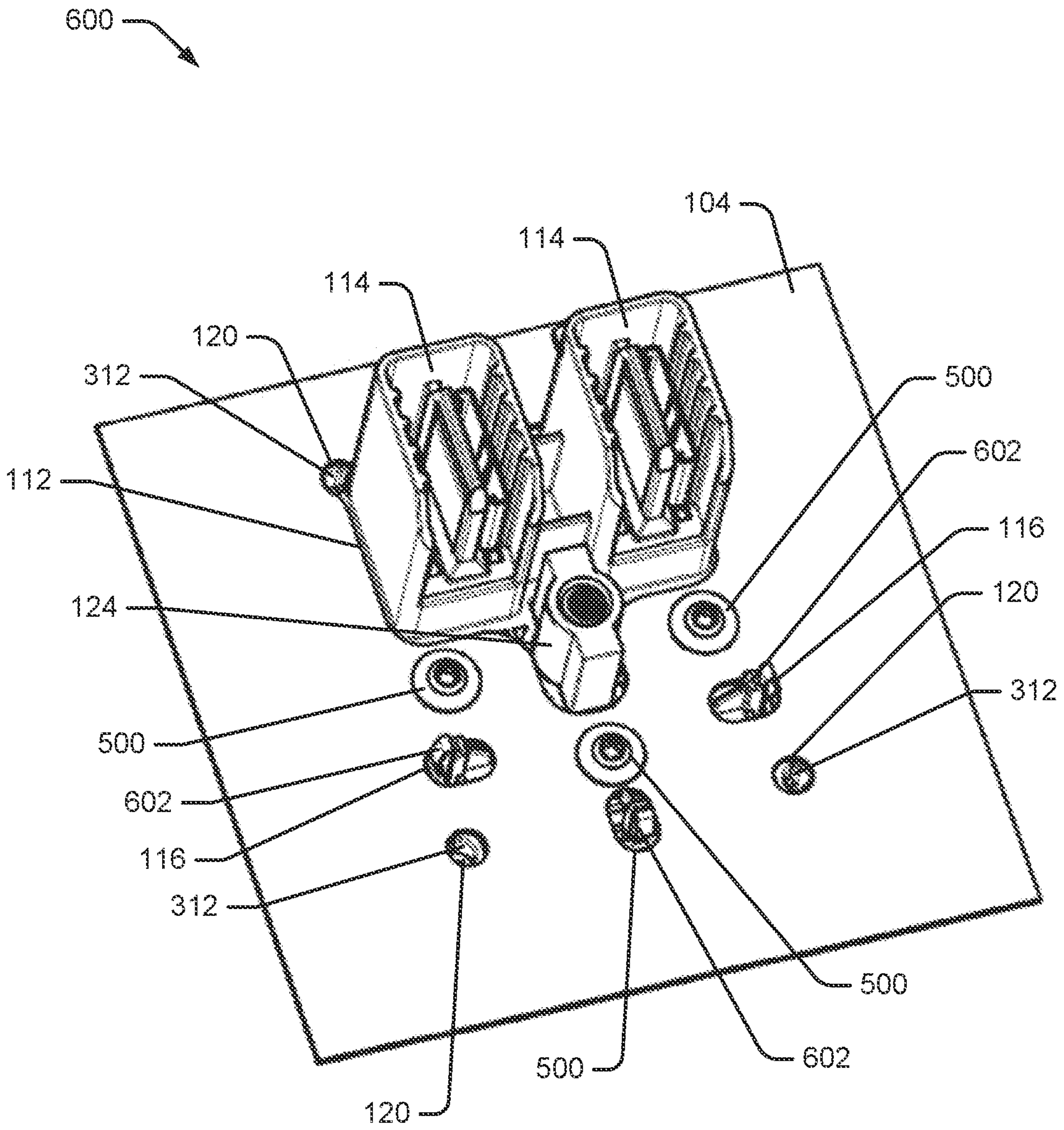
FIG. 6 illustrates an example assembly of a backing plate for mounting and sealing an electrical connector to an intermediate surface in an installed configuration without an electrical connector.

FIG. 6 is an illustration of an example assembly 600 in an installed configuration. The assembly 600 is similar to the assembly 100 except that the electrical connector 102 is not shown. Assembly 600 is an example of the backing plate 106 and the electrical header 108 installed in the intermediate surface 104 and ready for acceptance of the corresponding electrical connector 102.

The electrical header 108 is held between the backing plate 106, which is occluded by intermediate surface 104, and the intermediate surface 104 by screws 500 passing through the backing plate mounting holes 118, through the electrical header 108, and threaded into the intermediate surface attachment portion 308 of the backing plate 106. The terminal portion 114 of the electrical header 108 extends through terminal hole 112 of the intermediate surface 104 for mating with a corresponding terminal portion of the electrical connector 102. Header locating portions 602 extend through header locating holes 116 of the intermediate surface 104 and allow for the electrical header 108 and backing plate 106 to be located prior to installing screws 500 to secure the backing plate 106 (and electrical header 108) to the intermediate surface 104.

The connector attachment portion 124 of the backing plate 106 extends through the connector attachment portion hole 122 of the intermediate surface 104 and is configured to engage with the backing plate attachment portion 206 of the electrical connector 102. When attached to the intermediate surface 104, the connector locator holes 312 of the backing plate 106 align with connector locating holes 120 for acceptance of the connector locator portions 208 of the electrical connector 102.

From the above, it is readily apparent how the backing plate 106 allows the electrical connector 102 to seal to the intermediate surface 104, even when the intermediate surface 104 has a surface irregularity, e.g., bend, bow, or crease. The backing plate 106 provides a backing surface 304 that is flat that causes the sealing surface 200 of the electrical connector 102 to deform surface irregularities within the intermediate surface 104 to be flat when the electrical connector 102 is tightened. In other words, the backing plate 106 flattens the intermediate surface when the electrical connector 102 is tightened. Furthermore, the backing plate 106 can be part of a shielding circuit for the electrical connector 102 by allowing for an electrically resistive coating to be applied to an entirety of the intermediate surface 104 once fabricated.

EXAMPLES

Example 1: A backing plate configured to mount and seal an electrical connector to an intermediate surface disposed between the backing plate and the electrical connector, the backing plate comprising: an inner portion having a first thickness; and an outer portion having a second thickness that is greater than the first thickness and surrounding a perimeter of the inner portion, the outer portion forming a cavity within the backing plate; a connector attachment portion configured to attach the backing plate to the electrical connector; and an intermediate surface attachment portion configured to attach the backing plate to the intermediate surface.

Example 2: The backing plate of example 1, wherein the backing plate has a higher rigidity than the intermediate surface.

Example 3: The backing plate of example 1, wherein the outer portion has a backing surface that is generally planar, the backing surface having a shape that corresponds to a sealing ring of the electrical connector.

Example 4: The backing plate of example 3, wherein the backing surface contains at least one sealing groove configured to facilitate a seal between the backing plate and the intermediate surface.

Example 5: The backing plate of example 1, wherein the connector attachment portion comprises a boss protruding from the inner portion with a threaded hole disposed within the boss.

Example 6: The backing plate of example 5, wherein the boss is configured to pass through the intermediate surface and into the electrical connector.

Example 7: The backing plate of example 1, further comprising: one or more cutouts through the inner portion, the cutouts configured to allow a terminal portion or electrical leads to pass therethrough, the terminal portion or electrical leads being of the electrical connector or an electrical header.

Example 8: The backing plate of example 7, wherein the cavity is configured to accept the electrical header.

Example 9: The backing plate of example 1, wherein the intermediate surface attachment portion comprises one or more threaded holes disposed on the inner portion.

Example 10: The backing plate of example 9, wherein the threaded holes are longer than the first thickness and disposed in mounting bosses extending away from the cavity.

Example 11: The backing plate of example 1, wherein the backing plate does not disrupt a shielding circuit of the electrical connector.

Example 12: An electrical connector assembly comprising: an electrical connector comprising: one or more electrical terminals; a backing plate attachment portion; and a sealing surface configured to seal the electrical connector to an intermediate surface; a backing plate comprising: a backing surface having a shape that corresponds to the sealing surface of the electrical connector; one or more cutouts through the backing plate; a connector attachment portion configured to mate with the backing plate attachment portion of the electrical connector; and an intermediate surface attachment portion configured to attach the backing plate to the intermediate surface; and an electrical header comprising: a lead portion configured to extend through the cutouts of the backing plate; and a terminal portion configured to mate with the electrical terminals of the electrical connector.

Example 13: The electrical connector assembly of example 12, wherein the electrical header is configured to be disposed between the backing plate and the intermediate surface.

Example 14: The electrical connector assembly of example 13, wherein the electrical header is configured to be located by a cavity within the backing plate.

Example 15: The electrical connector assembly of example 12, wherein the backing plate attachment portion of the electrical connector comprises a cavity for acceptance of the connector attachment portion of the backing plate.

Example 16: The electrical connector assembly of example 15, wherein the backing plate attachment portion comprises a bolt and the connector attachment portion comprises a threaded hole.

Example 17: The electrical connector assembly of example 12, wherein the intermediate surface attachment portion comprises one or more threaded holes configured to accept screws, the screws configured to locate the backing plate relative to the intermediate surface for attachment of the electrical connector.

Example 18: The electrical connector assembly of example 12, wherein the backing plate has a higher rigidity than the intermediate surface.

Example 19: The electrical connector assembly of example 12, wherein the intermediate surface is sheet metal.

Example 20: The electrical connector assembly of example 12, wherein the electrical connector further comprises one or more connector locating portions configured to extend through the intermediate surface and into one or more corresponding connector locating holes of the backing plate.

CONCLUSION

Although a lever-type electrical connector assembly and portions thereof have been described in language specific to features and/or methods, it is to be understood that the subject of the appended claims is not necessarily limited to the specific features or methods described. Rather, the specific features and methods are disclosed as example implementations of a lever-type electrical connector assembly.

What is claimed is:

1. An electrical connector assembly comprising:

an electrical connector comprising:
- one or more electrical terminals;
- a backing plate attachment portion; and
- a sealing surface configured to seal the electrical connector to an intermediate surface of a mounting structure; and a backing plate comprising:
- a backing surface having a shape that corresponds to the sealing surface of the electrical connector;
- one or more cutouts through the backing plate configured to allow for one or more electrical leads to pass therethrough, the electrical leads being of the electrical connector or an electrical header; and
- a connector attachment portion configured to mate with the backing plate attachment portion of the electrical connector, wherein mating of the connector attachment portion with the backing plate attachment portion generates force between the electrical connector and the intermediate surface to seal the electrical connector to the intermediate surface of the mounting structure at the sealing surface.

2. The electrical connector assembly of claim 1, wherein the connector attachment portion includes a threaded hole for receiving a threaded bolt provided through the backing plate attachment portion, wherein tightening of the threaded bolt generates force between the electrical connector and the intermediate surface.

3. The electrical connector assembly of claim 1, wherein the sealing surface includes first and second perimeter walls surrounding a groove that houses a sealing ring, wherein the sealing ring is brought into contact with the intermediate surface of the mounting structure.

4. The electrical connector assembly of claim 3, wherein the first perimeter wall and the second perimeter wall are approximately equal in height.

5. The electrical connector assembly of claim 1, wherein the sealing surface includes a flat gasket that is brought into contact with the intermediate surface of the mounting structure.

6. The electrical connector assembly of claim 1, wherein the connector attachment portion includes one or more bosses protruding from the backing plate.

7. The electrical connector assembly of claim 1, wherein the backing plate is formed of a material having a first rigidity and the mounting structure is formed of a material having a second rigidity, wherein the first rigidity is greater than the second rigidity.

8. The electrical connector assembly of claim 7, wherein the force generated between the electrical connector and the intermediate surface flattens irregularities associated with the mounting structure to seal the electrical connector to the intermediate surface of the mounting structure at the sealing surface.

9. The electrical connector assembly of claim 1, wherein the backing plate further includes an intermediate surface attachment portion configured to attach the backing plate to the intermediate surface.

10. The electrical connector assembly of claim 1, wherein the backing plate includes an inner portion having a first thickness and an outer portion having a second thickness greater than the first thickness, wherein the outer portion defines a cavity for receiving the electrical header.

11. A backing plate configured to mount and seal an electrical connector to an intermediate surface disposed between the backing plate and the electrical connector, the backing plate comprising:

a connector attachment portion configured to attach the backing plate to the electrical connector;

an intermediate surface attachment portion configured to attach the backing plate to the intermediate surface; and one or more cutouts, the cutouts configured to allow for a terminal portion or electrical leads, the terminal portion or electrical leads being of the electrical connector or an electrical header, wherein the backing plate is comprised of a material having a rigidity greater than a rigidity of the intermediate surface disposed between the backing plate and the electrical connector.

12. The backing plate of claim 11, wherein the connector attachment portion includes one or more bosses extending from the backing plate toward the electrical connector.

13. The backing plate of claim 12, wherein the connector attachment portion includes a threaded hole for receiving a bolt provided through the electrical connector, wherein tightening the bolt generates force between the backing plate and the electrical connector.

14. The backing plate of claim 11, further including:

an inner portion having a first thickness; and an outer portion having a second thickness that is greater than the first thickness and surrounding a perimeter of the inner portion, the outer portion forming a cavity within the backing plate.

15. A method of securing an electrical connector to a mounting structure, the method comprising:

affixing a backing plate to the mounting structure, the mounting structure located between the electrical connector and the backing plate, wherein the backing plate includes one or more intermediate surface attachment portions for securing the backing plate to the mounting structure and a connector attachment portion that extends toward the electrical connector; and affixing the electrical connector to the mounting structure opposite the backing plate, wherein the electrical connector includes a sealing surface and a backing plate attachment portion that mates with a connector attachment portion of the backing plate, wherein mating the backing plate attachment portion and the connector attachment portion generates force between the backing plate and the electrical connector that flattens the mounting structure located between the backing plate and the electrical connector and creates a seal between the electrical connector and the mounting structure at the sealing surface.

16. The method of claim 15, wherein mating the backing plate attachment portion and the connector attachment portion includes tightening a threaded bolt into a threaded hole associated with the connector attachment portion to generate force between the electrical connector and the backing plate.

17. The method of claim 15, wherein the connector attachment portion includes one or more bosses protruding from the backing plate, each boss including a threaded hole for receiving a threaded bolt provided through a corresponding backing plate attachment portion.

18. The method of claim 15, wherein the backing plate further includes one or more cutouts through the backing plate, and wherein the electrical connector further includes one or more electrical leads configured to pass through the one or more cutouts when the electrical connector is affixed to the mounting structure opposite the backing plate.

* * * * *